United States Patent Office 3,173,946
Patented Mar. 16, 1965

3,173,946
PROCESS FOR THE HALOGENATION OF LEONARDITE AND THE PRODUCT THEREOF
Evan Baltazzi, Brookfield, and Elmar Wilip, Oak Park, Ill., assignors to Nalco Chemical Company, Chicago, Ill., a corporation of Delaware
No Drawing. Filed July 7, 1961, Ser. No. 122,421
7 Claims. (Cl. 260—515)

This invention relates to a method for halogenating leonardite. Particularly, the invention relates to a method of halogenating leonardite whereby a halogen lean leonardite fraction and a halogen rich leonardite fraction are produced. The invention is also concerned with halogenated leonardites containing varying amounts of halogen.

Leonardite is a coal-like substance similar to lignite. Although physically similar, leonardite has a richer oxygen content than does lignite. Generally, leonardite contains from 28 to 29% by weight of oxygen, whereas lignite contains from about 19 to 20% by weight.

The high oxygen content of leonardite has been ascribed to the presence of carboxylic acid groups in the leonardite molecule. Spectral analysis has indicated that leonardite is capable of being generically defined as mixed salts of humic acids. Although not proven conclusively, leonardite is probably a large aryl carboxylic polymeric molecule.

Leonardite has little value as a fuel. It has been investigated to some extent as a chemical of commerce, but for most purposes the material is not particularly satisfactory in most areas of industrial chemistry. One of the chief difficulties in commercially exploiting leonardite resides in its poor solubility characteristics in both aqueous and organic media. While the material is soluble in aqueous alkaline solutions, it is relatively insoluble in common organic solvents such as alcohols, ketones, and the like. Since the carboxylic acid portion of the molecule renders it interesting from a standpoint of being a useful chemical, nevertheless, due to its poor solubility characteristics the carboxylic acid portion of the molecule is not capable of being fully utilized. Conventional research in the modification of humic acids has been directed to oxidative degradation of the molecule whereby the large cumbersome organic structure is broken up into smaller chemical units. This degradative approach has met with some success in that carboxylic acids have been produced, but in breaking up the molecule many of its valuable properties, e.g., high molecular weight and carbocyclic-aromatic type structure are destroyed.

Chemical modifications such as halogenation of humic acids has been reported in the literature. Most of these reactions were conducted in an aqueous media with a halogenation catalysis. Under the conditions of the reaction halogen halide was evolved. These halogenations tend to either produce substituted products, or in some instances, degradation of the humic acid molecule occurs.

It would be a valuable contribution to the art if it would be possible to chemically modify leonardite whereby its molecular configuration would be substantially uneffected. This modification should also allow further chemical processing to be performed on the molecule. It would be of further advantage if leonardite could be chemically treated whereby its solubility characteristics would be substantially modified without a breakdown or degradation of its molecular configuration. It, therefore, becomes an object of the invention to provide a method for halogenating leonardite whereby halogen is introduced into the molecule under conditions whereby substantially no degradation of the leonardite occurs.

Another object is to provide a process for halogenating leonardite whereby a halogen rich fraction and a halogen lean fraction are produced, each of which fractions has different solubility characteristics in various types of organic solvents.

A further object is to provide novel halogen containing leonardite products which are useful as chemical intermediates and which may be acted upon by various chemical reagents which are capable of further modifying and improving its chemical and physical characteristics. Other objects will appear hereinafter.

In accordance with the invention, it has been found that leonardite may be photo-halogenated whereby a halogen lean fraction and halogen rich fraction are produced. The photo-halogenation is conducted in a halogen non-reactive organic liquid in the presence of a light source having a wave length of at least 1800 A. units but less than 10,000 A. units. The halogenation agent comprises a molecular halogen such as molecular chlorine, bromine, iodine or fluorine with the amount being added during the reaction being sufficient to at least form a saturated solution of the halogenating agent in the halogen non-reactive organic liquid.

The reaction is conducted at a temperature not lower about 4° C. and may be performed at an elevated temperature which corresponds to the boiling point of the halogen non-reactive organic liquid. It should be understood that vacuum or pressure techniques may be used thereby allowing an increase in the range of temperatures described above. In a preferred embodiment, the reactions hereinafter described are conducted at atmospheric pressure at about 15° C. or higher in a suitable reaction vessel whereby the halogenating agent may be either recovered or suitably vented to the atmosphere.

The reaction should be run for at least 5 hours to provide the halogenated products of the invention, although in a preferred embodiment the reaction is conducted for at least 15 hours and may run as long as from 1 to 2 days, depending on the particular temperature conditions and the type of halogenating agents used.

The halogen non-reactive organic liquid may be selected from any number of halogenated organic materials. Preferably, the halogen non-reactive organic liquid will be a halogen-containing aliphatic hydrocarbon of not more than 4 carbon atoms. Such chemicals as carbon tetrachloride, carbon tetrabromide, perchloroethylene, ethylene dichloride, hexachloro-1,3-butadiene and the like are admirably suited for use as the halogen non-reactive organic liquid. It will be understood that the halogen non-reactive organic liquid should be of such a type that under the conditions of the reactions described herein, it will not react with either the leonardite or with the halogen being added during the reaction. Thus, for example, if addition of chlorine to an organic liquid causes either its halogenation or degradation, that liquid would not be suitable for use in the practices of the invention. Of the several halogen non-reactive organic liquids that are suitable for use in the invention, the most preferred from a standpoint of availability, cost and stability under the reaction conditions is carbon tetrachloride.

The photo-halogenation involved in this invention, may be conducted under a wide variety of light conditions, although in a preferred embodiment it is desirable to use ultra violet light which conventionally has a wave length of between 1800 A. units to about 3,000 A. units. The amount of molecular halogen added to the reaction may be varied. In most cases, it is desirable that the halogenating agent be bubbled or passed through halogen non-reactive organic liquid for a period of time sufficient to insure saturation of the organic liquid with the halogen. In most cases, the halogen should be introduced continuously throughout the entire reaction period. The reaction should be allowed to continue in the presence of the light source for about 15 to 25 hours to obtain maximum yields.

At the end of the reaction period a substantial portion of the halogenated leonardite will be suspended in the halogen non-reactive organic liquid. This product may be withdrawn from the reaction mass by decantation, filtration and the like. This halogenated leonardite fraction will usually contain between 15 to 45% by weight of halogen, expressed as Cl, and will be in appearance a dark brown amorphous solid. These products are usually soluble in lower aliphatic ketones, e.g., acetone, methyl ethyl ketone, isopropyl butyl ketone, dimethyl formamide and in aqueous alkali solutions. They are insoluble in carbon tetracholride. This particular group of products is designated herein as the halogen lean leonardite fraction.

Remaining dissolved in the halogen non-reactive organic liquid is a halogen rich leonardite fraction which may be readily removed by distillation of the organic solvent.

The residue from the removal of the halogen non-reactive organic liquid, is a viscous dark brown material which may be dried to a dark brown powder. This product usually contains from between 20 to 65% by weight of a halogenated leonardite which is soluble in carbon tetrachloride. It is usually insoluble in lower aliphatic ketones and aqueous alkali solutions.

The amount of halogen contained in both the halogen lean and halogen rich fractions of the halogenated leonardites is directly dependent upon the time and temperature of the reaction conditions. Usually the longer the time and the more elevated the temperature the higher will be the halogen content of the reacted leonardites. Time appears more critical than temperature in producing highly halogenated leonardite fractions. When it is desired to produce leonardite fractions containing about 45% halogen as the halogen lean fraction and as much as 65% in the halogen rich fraction, it is necessary that the reaction be run for at least 24 hours at a temperature of at least 21–23° C.

To further illustrate the invention the following are given by way of example.

Example I

A commercially mined sample of leonardite was photo-chlorinated in accordance with the following procedure. 250 grams of the sample were treated with a 15% hydrochloric acid solution at room temperature, e.g., 21–23° C. for about 2 hours. (This acid washing although not essential to the process of the invention is desirable since it tends to free inorganic mineral matter from the leonardite and tends to convert any carboxylic acid salts to the hydrogen form.)

The acid treated leonardite was then added to a chemical reaction flask which contained 2500 ml. carbon tetrachloride to suspend the 250 grams of leonardite. A laboratory ultra violet light source was inserted into a reaction flask fitted with a condenser, stirrer, heating mantle and gas connection. Chlorine gas was fed into the gas connection and bubbled into the flask. Stirring was maintained through the reaction at 77° C., with the carbon tetrachloride being allowed to reflux. Chlorine gas feed was continued for about 15 hours. At the end of 15 hours the ultra violet light source was removed and the stirring discontinued. During the reaction there was no indication of hydrogen halide formation. Remaining suspended in the carbon tetrachloride were 296 grams of a halogenated leonardite which was insoluble in carbon tetrachloride, but which was soluble in acetone, methylethyl ketone and dilute solutions of sodium hydroxide, as well as being soluble in dimethyl formamide. This product when analyzed was shown to have a chlorine content of 27.3%.

The carbon tetrachloride was then distilled. Remaining as a pot residue was 66 grams of a black oily compound which analyzed as having a chlorine content of 47.5%. When dried it was a dark brown amorphous powder. It was soluble in carbon tetrachloride and in ethanol.

Example II

The procedure used was the same as described above, except in this example 300 grams of acid washed leonardite were used and the halogen non-reactive organic solvent used as the suspending agent was dimethyl formamide. The reaction was conducted for 7 hours. The finished reaction produced a dimethyl formamide insoluble halogenated leonardite which contained 16.2% by weight of chlorine. The pot residue resulting from the distillation of the dimethyl formamide produced a chlorinated leonardite which was insoluble in acetone and had a chlorine content of 23.2%.

Example III

The same technique and procedure as described in Example I were used. The halogen non-reactive solvent was carbon tetrachloride. The reaction was conducted for 20 hours.

The suspended halogenated leonardite was removed, dried and analyzed. The results of this analysis showed the product to contain the following:

| | Percent |
|---|---|
| C | 39.37 |
| H | 1.51 |
| Cl | 30.74 |
| O | 19.92 |
| Ash | 12.74 |

The pot residue remaining after distillation of the carbon tetrachloride was dried. The analysis showed the following to be present:

| | Percent |
|---|---|
| C | 33.40 |
| H | 2.48 |
| Cl | 57.61 |
| O | 6.07 |
| Ash | 0.87 |

The halogen lean fraction which contained 30.74% chlorine was soluble in acetone and ethanol and insoluble in carbon tetrachloride. The halogen rich fraction which contained 57.61% chlorine was soluble in carbon tetrachloride and benzene.

In Examples I–III no evolution of halogen halide was observed indicating the chlorinations were addition type reactions. To illustrate the differences achieved when leonardite is halogenated by conventional halogenation techniques, Examples IV and V are presented below:

Example IV 1500 grams of leonardite were chlorinated in 3 liters of water using a reflux reaction temperature of 100° C. To the reaction mass was added an iron powder catalyst. The reaction was continued for 20 hours, throughout which period chlorine gas was bubbled through the reactants. The suspended product was removed at the end of the reaction period and was shown to have a chlorine content of 14.2%. There was no residue remaining after distillation of the water. Throughout the entire reaction period the evolution of hydrogen chloride was evident.

Example V

In this example the solvent use was hexachloro-1,3-butadiene. The reaction was conducted under reflux conditions, e.g., 210–212° C. Iron powder was again used as the catalyst. The resultant product contained 11.7% chlorine. Distillation of hexachloro-1,3-butadiene showed no pot residue to be evident. Hydrogen chloride was steadily evolved throughout the entire reaction.

The evolution of hydrogen chloride during the halogenation described in Examples IV and V, is believed to evidence substitutive type reactions and degradation occurring. Such reactions obviously modify the basic molecular configuration of the leonardite. The halogenations conducted in the presence of ultra violet light, in accordance with the teachings set forth herein, produce additive type halogenated leonardites. Conventional halogenation reactions produce a partially halogenated leonardite type product whereas the techniques of the invention afford a method of producing both a halogen lean and a halogen rich type leonardite which have distinct and independent physical and chemical characteristics.

The halogen lean leonardite fractions of the invention are capable of being alkylated under typical Friedel-Crafts conditions to attach aromatic nuclei into the halogenated leonardite molecule. These products may in turn be sulfonated using conventional sulfonating agents, e.g., chloro-sulfonic acid, $SO_3$ and the like, to produce oil soluble detergents which are useful as lubricating oil additives. Both halogenated leonardite fractions are extremely valuable intermediates which permit further chemical modification of the leonardite molecule to be conducted. This as a substantial advance in the art since without the halogen-modification reaction of the invention, it is nearly impossible to solubilize leonardite in conventional organic solvents, whereby they may be further reacted upon by conventional chemical reagents.

The halogen rich leonardite fractions which are highly halogenated have potential applications in such areas as insecticides, fungicides, and the like. These products under heat will evolve chlorine which makes them useful as sanitizing agents in such industrial areas as papermills, cooling towers, and the like. They also tend to improve the bonding of asphalt to conventional aggregate materials used in the construction of highways.

Having thus described our invention, it is claimed as follows:

1. A method of halogenating leonardite to produce a halogen lean leonardite fraction and a halogen rich leonardite fraction which comprises the steps of suspending leonardite in a halogen substituted aliphatic hydrocarbon which contains not more than 4 carbon atoms, subjecting the leonardite suspension to a light source having a wave length of at least 1,800 A. but less than 10,000 A., adding molecular halogen to said leonardite suspension in an amount at least sufficient to saturate the organic liquid, continuing to subject the leonardite suspension to the light source for at least 5 hours at a temperature ranging between 4° C. and the boiling point of the organic liquid, separating the halogenated suspended leonardite which comprises the halogen lean leonardite fraction from the organic liquid and then removing the organic liquid to provide as a residue a halogen rich leonardite fraction.

2. The method of claim 1 where the light source has a wave length of between 1,800 A. to 3,000 A.

3. The method of claim 1 where the molecular halogen is added to the leonardite suspension throughout the reaction period.

4. The method of chlorinating leonardite to produce a chlorine lean leonardite fraction and a chlorine rich leonardite fraction which comprises the steps of suspending leonardite in a chlorinated aliphatic organic liquid which contains not more than 4 carbon atoms, subjecting the leonardite to a light source having a wave length of from 1,800 A. to 3,000 A., adding molecular chlorine to said leonardite suspension, continuing to subject the leonardite suspension to the light source for at least 15 hours at a temperature ranging between 15° C. to the boiling point of the chlorinated aliphatic organic liquid, continuing the addition of molecular chlorine throughout the reaction period, separating the chlorinated suspended leonardite, which comprises the chlorine lean fraction from the chlorinated aliphatic organic liquid and then distilling the chlorinated aliphatic organic liquid to provide as a residue a chlorine rich leonardite fraction.

5. The method of claim 4 where the chlorinated aliphatic organic liquid is carbon tetrachloride.

6. A chlorinated leonardite comprising leonardite containing from 15 to 45% by weight of chlorine, said chlorinated leonardite being a dark brown, amorphous, solid being soluble in lower aliphatic ketones, dimethyl formamide and in aqueous alkali solutions and insoluble in carbon tetrachloride, which chlorinated leonardite has been made by suspending leonardite in a halogen substituted aliphatic hydrocarbon which contains not more than 4 carbon atoms, subjecting the leonardite suspension to a light source having a wave length of at least 1,800 A. but less than 10,000 A., adding molecular chlorine to said leonardite suspension in an amount at least sufficient to saturate the halogen substituted aliphatic hydrocarbon, continuing to subject the leonardite suspension to the light source for at least 5 hours at a temperature ranging between 4° C. and the boiling point of the organic liquid, and separating out the solid chlorinated leonardite from its suspension in the halogen substituted aliphatic hydrocarbon.

7. A chlorinated leonardite comprising leonardite containing from 20 to 65% by weight of chlorine, said chlorinated leonardite being a dark brown, amorphous solid being soluble in carbon tetrachloride and insoluble in lower aliphatic ketones, and aqueous alkali solutions, which chlorinated leonardite has been made by suspending leonardite in a halogen substituted aliphatic hydrocarbon which contains not more than 4 carbon atoms, subjecting the leonardite suspension to a light source having a wave length of at least 1,800 A. but less than 10,000 A., adding molecular chlorine to said leonardite suspension in an amount at least sufficient to saturate said aliphatic hydrocarbon, continuing to subject the leonardite suspension to the light source for at least 5 hours at a temperature ranging between 4° C. and the boiling point of the halogen substituted aliphatic hydrocarbon until said leonardite is chlorinated to the degree necessary to solubilize it in the halogen substituted aliphatic hydrocarbon, separating out a solid chlorinated leonardite fraction from its suspension in the halogen substituted aliphatic hydrocarbon and then recovering the solubilized chlorinated leonardite from the halogen substituted aliphatic hydrocarbon.

References Cited in the file of this patent

Fowkes et al.: "Leonardite: A lignite Byproduct," Bureau of Mines, Report of Investigations 5611, June 16, 1960.

Feustel et al.: "Chem. Abstracts," vol. 30, page 7263(9), 1936.

Eller et al.: "Chem. Abstracts," vol. 17, page 2270(5), 1923.

Fukushima et al.: "Chem. Abstracts," vol. 53, page 3652(b), 1959.

Dragunov et al.: "Chem. Abstracts," vol. 53, page 10634(g), 1959.

UNITED STATES PATENT OFFICE
CERTIFICATE OF CORRECTION

Patent No. 3,173,946                                March 16, 1965

Evan Baltazzi et al.

It is hereby certified that error appears in the above numbered patent requiring correction and that the said Letters Patent should read as corrected below.

Column 2, line 21, after "lower" insert -- than --; line 71, for "25" read -- 24 --.

Signed and sealed this 24th day of August 1965.

(SEAL)
Attest:

ERNEST W. SWIDER
Attesting Officer

EDWARD J. BRENNER
Commissioner of Patents